US008768768B1

(12) United States Patent
Merrill

(10) Patent No.: US 8,768,768 B1
(45) Date of Patent: *Jul. 1, 2014

(54) VISITOR PROFILE MODELING

(75) Inventor: John W. Merrill, Redmond, WA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/481,679

(22) Filed: May 25, 2012

Related U.S. Application Data

(63) Continuation of application No. 12/204,679, filed on Sep. 4, 2008, now Pat. No. 8,190,475.

(60) Provisional application No. 60/970,208, filed on Sep. 5, 2007.

(51) Int. Cl.
*G06Q 30/02* (2012.01)
*G06Q 30/00* (2012.01)

(52) U.S. Cl.
CPC ......... *G06Q 30/02* (2013.01); *Y10S 707/99936* (2013.01)
USPC .................. 705/14.49; 705/14.52; 705/14.53; 707/999.006

(58) Field of Classification Search
CPC G06Q 30/02; G06Q 30/0251; G06Q 30/0277
USPC ................. 705/14.49, 14.52, 14.53
See application file for complete search history.

(56) References Cited

U.S. PATENT DOCUMENTS

| | | | |
|---|---|---|---|
| 5,870,744 A | 2/1999 | Sprague | |
| 6,041,311 A | 3/2000 | Chislenko et al. | |
| 6,438,579 B1 | 8/2002 | Hosken | |
| 6,681,247 B1 * | 1/2004 | Payton | 709/217 |

(Continued)

FOREIGN PATENT DOCUMENTS

WO    WO2006004455    4/2006

OTHER PUBLICATIONS comScore, Inc. Home page, Product pages: Ad Metrix, Brand Metrix, Campaign Metrix, Marketer, Marketing Solutions, Media Metrix Campaign R/F™, U.S. Hispanic Services, LocalScore, Local Market Reporting, Online Search Solutions, Plan Metrix, Segment Metrix H/M/L, Video Metrix, Widget Metrix [online]. comScore, Inc. [retrieved on Sep. 2, 2008]. Retrieved from the Internet < http://www.comscore.com/>.

(Continued)

*Primary Examiner* — Victoria Vanderhorst
*Assistant Examiner* — Adam Chornesky
(74) *Attorney, Agent, or Firm* — Fish & Richardson P.C.

(57) ABSTRACT

Methods, systems and computer program products for inferring a value of a visitor property for a visitor to a web destination are described. A set of traversals indicating visits to web destinations are received, including scored and unscored traversals. Initial destination scores for the web destinations visited by the scored traversals are inferred based on the known scores of the scored traversals. Initial scores for the unscored traversals are estimated based on the initial destinations scores. Revised destination scores for the web destinations visited by the scored traversals and initial destination scores for the web destinations only visited by the unscored traversals are inferred. Revised scores for the unscored traversals are estimated based on the revised destination scores and initial destination scores. Revised destination scores for all of the web destinations are inferred based on the scores of the scored traversals and the revised scores of the unscored traversals.

20 Claims, 7 Drawing Sheets

(56) References Cited

U.S. PATENT DOCUMENTS

| | | | |
|---|---|---|---|
| 6,950,987 | B1 | 9/2005 | Hargraves et al. |
| 7,130,808 | B1 | 10/2006 | Ranka et al. |
| 7,181,412 | B1 | 2/2007 | Fulgoni et al. |
| 7,213,032 | B2 | 5/2007 | Mascarenhas |
| 7,284,008 | B2 | 10/2007 | Henkin et al. |
| 7,318,066 | B2 | 1/2008 | Kaufman et al. |
| 7,349,899 | B2* | 3/2008 | Namba ............................. 1/1 |
| 7,403,941 | B2* | 7/2008 | Bedworth et al. ................. 1/1 |
| 7,406,434 | B1 | 7/2008 | Chang et al. |
| 7,451,099 | B2 | 11/2008 | Henkin et al. |
| 7,493,655 | B2 | 2/2009 | Brown |
| 7,698,422 | B2 | 4/2010 | Vanderhook et al. |
| 7,707,091 | B1 | 4/2010 | Kauffman et al. |
| 7,734,632 | B2 | 6/2010 | Wang |
| 7,761,423 | B1 | 7/2010 | Cohen |
| 7,783,532 | B2 | 8/2010 | Hsu et al. |
| 7,870,021 | B2 | 1/2011 | Mankoff |
| 7,930,285 | B2 | 4/2011 | Abraham et al. |
| 8,073,807 | B1 | 12/2011 | Srinivasaiah |
| 8,095,589 | B2* | 1/2012 | Singh et al. .................. 709/201 |
| 8,190,475 | B1 | 5/2012 | Merrill |
| 2002/0004733 | A1 | 1/2002 | Addante |
| 2002/0123928 | A1 | 9/2002 | Eldering et al. |
| 2004/0002943 | A1 | 1/2004 | Merrill et al. |
| 2004/0064415 | A1 | 4/2004 | Abdallah et al. |
| 2004/0153514 | A1 | 8/2004 | Crane |
| 2005/0256756 | A1 | 11/2005 | Lam et al. |
| 2005/0267766 | A1 | 12/2005 | Galbreath et al. |
| 2006/0106780 | A1 | 5/2006 | Dagan |
| 2006/0167971 | A1 | 7/2006 | Breiner |
| 2006/0200556 | A1* | 9/2006 | Brave et al. ................... 709/224 |
| 2007/0038516 | A1 | 2/2007 | Apple et al. |
| 2007/0073681 | A1 | 3/2007 | Adar et al. |
| 2007/0089150 | A1* | 4/2007 | Bowler ......................... 725/113 |
| 2008/0065701 | A1 | 3/2008 | Lindstrom et al. |
| 2008/0104225 | A1 | 5/2008 | Zhang et al. |
| 2008/0120308 | A1 | 5/2008 | Martinez et al. |
| 2008/0126411 | A1 | 5/2008 | Zhuang et al. |
| 2008/0140508 | A1 | 6/2008 | Anand et al. |
| 2008/0140524 | A1 | 6/2008 | Anand et al. |
| 2008/0155078 | A1 | 6/2008 | Parkkinen et al. |
| 2008/0215607 | A1 | 9/2008 | Kaushansky et al. |
| 2008/0242279 | A1 | 10/2008 | Ramer et al. |
| 2008/0263053 | A1 | 10/2008 | Hull |
| 2008/0270425 | A1 | 10/2008 | Cotgreave |
| 2008/0275980 | A1 | 11/2008 | Hansen |
| 2009/0029687 | A1 | 1/2009 | Ramer et al. |
| 2009/0055139 | A1 | 2/2009 | Agarwal et al. |
| 2009/0061406 | A1 | 3/2009 | Clayton et al. |
| 2010/0164957 | A1 | 7/2010 | Lindsay et al. |
| 2010/0205037 | A1 | 8/2010 | Besehanic |

OTHER PUBLICATIONS

QuestionPro Home page, Product page: Survey Software [online]. QuestionPro. [retrieved on Sep. 2, 2008]. Retrieved from the Internet: <http://www.questionpro.com/>.
Hu, Jian, et al., "Demographic Prediction Based on User's Browsing Behavior," International World Wide Web Conference Committee (IW3C2), WWW 2007, May 8-12, 2007, Banff, Alberta, Canada, 10 pages.
"Logit," Wikipedia [online], Retrieved from the Internet: <http://en.wikipedia.org/wiki/Logit>, retrieved on Aug. 2, 2007, 2 pages.
"Expectation-maximization algorithm," Wikipedia [online], Retrieved from the Internet: <http://en.wikipedia.org/wiki/Expectation-maximization_algorithm>, retrieved on Jun. 15, 2007, 9 pages.
"Bernoulli distribution," Wikipedia [online], Retrieved from the Internet: <http://en.wikipedia.org/wiki/Bernoulli_distribution>, retrieved on Jun. 15, 2007, 2 pages.
"Binomial distribution," PlanetMath.Org [online], Retrieved from the Internet: <http://planetmath.org/?op=getobj&from=objects&name=BernoulliDistribution2>, retrieved on Jun. 15, 2007, 4 pages.
People's Daily Online, 'MySpace steps up security for teen users' [online] [retrieved on Jul. 17, 2009]. Retrieved from the Internet:http://english.peopledaily.com.cn/200606/23/eng20060623_276550.html, 2 pages.
NetIDme Home Page, 'NetIDme provides secure age and identify verification for the internet' [online] [retrieved on Jul. 17, 2009]. Retrieved from the Internet: http://web.archive.org/web/20070629100031/http://netideme.net/netidauthrenticate.htm, 2 pages.
comScore, Inc. Home page, Product pages: Brand Metrix, [online]. comScore, Inc. [retrieved on Sep. 2, 2008]. Retrieved from the Internet http://www.comscore.com/ , 1 page.
comScore, Inc. Home page, Product pages: Campaign Metrix, [online]. comScore, Inc. [retrieved on Sep. 2, 2008]. Retrieved from the Internet http://www.comscore.com/, 1 page.
comScore, Inc. Home page, Product pages: Marketer, [online]. comScore, Inc. [retrieved on Sep. 2, 2008]. Retrieved from the Internet http://www.comscore.com/, 1 page.
comScore, Inc. Home page, Product pages: Marketing Solutions, [online]. comScore, Inc. [retrieved on Sep. 2, 2008]. Retrieved from the Internet http://www.comscore.com/, 1 page.
comScore, Inc. Home page, Product pages: Media Metrix Campaign R/F™, [online]. comScore, Inc. [retrieved on Sep. 2, 2008]. Retrieved from the Internet http://www.comscore.com/, 1 page.
comScore, Inc. Home page, Product pages: U.S. Hispanic Services, [online]. comScore, Inc. [retrieved on Sep. 2, 2008]. Retrieved from the Internet http://www.comscore.com/, 1 page.
comScore, Inc. Home page, Product pages: LocalScore, [online]. comScore, Inc. [retrieved on Sep. 2, 2008]. Retrieved from the Internet http://www.comscore.com/, 2 pages.
comScore, Inc. Home page, Product pages: Local Market Reporting, [online]. comScore, Inc. [retrieved on Sep. 2, 2008]. Retrieved from the Internet http://www.comscore.com/, 1 page.
comScore, Inc. Home page, Product pages: Online Search Solutions, [online]. comScore, Inc. [retrieved on Sep. 2, 2008]. Retrieved from the Internet http://www.comscore.com/, 1 page.
comScore, Inc. Home page, Product pages: Plan Metrix, [online]. comScore, Inc. [retrieved on Sep. 2, 2008]. Retrieved from the Internet http://www.comscore.com/, 1 page.
comScore, Inc. Home page, Product pages: Segment Metrix H/M/L, [online]. comScore, Inc. [retrieved on Sep. 2, 2008]. Retrieved from the Internet http://www.comscore.com/, 1 page.
comScore, Inc. Home page, Product pages: Video Metrix, [online]. comScore, Inc. [retrieved on Sep. 2, 2008]. Retrieved from the Internet http://www.comscore.com/, 1 page.
comScore, Inc. Home page, Product pages: Widget Metrix [online]. comScore, Inc. [retrieved on Sep. 2, 2008]. Retrieved from the Internet http://www.comscore.com/, 1 page.
'Online Survey Software' [online]. QuestionPro 2006, [retrieved on Sep. 2, 2008]. Retrieved from the Internet: http://www.questionpro.com/products/index.html., 2 pages.
'Survey Software' [online]. QuestionPro 2007, [retrieved on Sep. 2, 2008]. Retrieved from the Internet: http://www.questionpro.com., 10 pages.
'Security and Privacy' [online]. QuestionPro 2006, [retrieved on Sep. 2, 2008]. Retrieved from the Internet: http://www.questionpro.com/security/index.html, 1 page.
Smart AdServer; Wikipedia; http://en.wikipedia.org/wiki/Smart_AdServer; accessed May 26, 2011.
'Testimonials' [online]. QuestionPro 2006, [retrieved on Sep. 2, 2008]. Retrieved from the Internet: http://www.questionpro.com/clients/comments.html., 7 pages.
'Sample Surveys-Sample Survey Questions-Survey Questions' [online]. QuestionPro 2006, [retrieved on Sep. 2, 2008]. Retrieved from the Internet: http://www.questionpro.com/sample/index.html, 2 pages.
'Online Research Made Easy', [brochure], QuestionPro 2007, 8 pages.
Yang, Wan-Shiou, Dia, Jia-Ben, Cheng, Hung-Chi, and Lin, Hsing-Tzu, 'Mining Social Networks for Targeted Advertising' *Proceedings of the 39th Hawaii International Conference on System Scienes-2006*, pp. 1-10.

(56) References Cited

OTHER PUBLICATIONS

Herlocker, Jonathan L., Konstan, Joseph A., Terveen, Loren G., and Riedl, John T., 'Evaluating Collaborative Filtering Information Systems', *ACM Transactions on Informational Systems*, vol. 22, No. 1, Jan. 2004, pp. 1-53.

'Support Vector Machine' [online], Wikipedia, [published on Sep. 13, 2006] [retrieved on May 21, 2009]. Retrieved from the Internet: http://web.archive.org/web/20060913000000/http://en.wikipedia.org.wiki/support_vector_machine, 4 pages.

Marks, Paul 'New Software can Identify You from Your Online Habits' [online], *NewScientist Tech*, [published on May 16, 2007] [retrieved on May 21, 2009]. Retrieved from: http://www.newscientist.com/article/mg19426046.400, 4 pages.

Macskassy, Sofus A., and Provost, Foster, 'A Simple Relational Classifier' *NYU Stern School of Business* [published 2003], 13 pages.

'Note on Terminology' [online], Wikipedia, [published on Sep. 13, 2006], [retrieved on May 21, 2009]. Retrieved from: http://web.archive.org/20060913000000/http://en.wikipedia.org/wiki/decision_tree, 1 page.

Rudin, Cynthia, Daubechies, Ingrid and Schapire, Robert E., 'Dynamics of AdaBoost' May 2005, *NSF Postdoc, BIO Division, Center for Neural Science, NYU*, 62 pages.

comScore, Inc. Home page, Product pages: comscore,Inc.-a Global Internet Information Provider, [online]. comScore, Inc. [retrieved on Sep. 2, 2008]. Retrieved from the Internet http://www.comscore.com/, 1 page.

USPTO STIC search May 26, 2011; SN12204679NPL.pdf.

USPTO STIC search Jun. 3, 2011; SN12204679NPL2.pdf.

'QuestionPro' [online]. QuestionPro Survey Software, 2006 [retrieved on May 12, 2011]. Retrieved from the Internet: <URL: http://replay.web.archive.org/20061028220630/http://www.questionpro.com/>.

'Market Research' [online]. QuestionPro Survey Software, 2006 [retrieved on May 12, 2011]. Retrieved from the Internet: <URL: http://replay.web.archive.org/20061113103908/http:/www.questionpro.com/marketresearch>.

'How it works' [online]. QuestionPro Survey Software, 2006 [retrieved on May 12, 2011]. Retrieved from the Internet: <URL: http://replay.web.archive.org/20061108115455/http:/www.questionpro.com/home/howItWoks.html>.

'Creating Your Survey' [online]. QuestionPro Survey Software, 2006 [retrieved on May 12, 2011]. Retrieved from the Internet: <URL: http://replay.web.archive.org/20061113133650/http:/www.questionpro.com/buildyoursurvey/>.

'Collecting Survey Results' [online]. QuestionPro Survey Software, 2006 [retrieved on Dec. 5, 2011]. Retrieved from the Internet: <URL: http://replay.web.archive.org/20061113133653/http:/wvvw.questionpro.com/collectyourdata/>.

'Automatic Reporting, Charts, Graphs' [online]. QuestionPro Survey Software, 2006 [retrieved on May 12, 2011]. Retrieved from the Internet: <URL: http://replay.web.archive.org/20061113133657/http:/www.questionpro.com/viewyourresults/>.

'Sample Surveys' [online]. QuestionPro Survey Software, 2006 [retrieved on May 12, 2011]. Retrieved from the Internet: <URL: http://replay.web.archive.org/20061113133701/http:/www.questionpro.com/sample/>.

Dialog Non-Patent Literature Search Dec. 21, 2011.

MacKinnon and Warren, "Age and Geographic Inferences of the LiveJournal Social Network," 23rd International Conference on Machine Learning, 2006, 8 pages.

\* cited by examiner

VISITOR PROFILE MODELING

CROSS-REFERENCE TO RELATED APPLICATIONS

This application is a continuation application of U.S. patent application Ser. No. 12/204,679, filed Sep. 4, 2008, which claims the benefit of U.S. Provisional Application No. 60/970,208, filed Sep. 5, 2007. The entire disclosures of both of these prior applications are incorporated herein by reference.

TECHNICAL FIELD

This invention relates to information management.

BACKGROUND

A website owner may find it useful to understand properties of visitors to the website. For example, the demographics of visitors to the website may be useful in selecting advertisements targeted to a particular portion of the website visitors. Some conventional systems use a panel-based approach in an attempt to acquire demographic information about website visitors. Individuals are invited to join a panel and software is installed on their computers, which monitors which websites they visit. The panelists are asked to provide demographic information. Accordingly, the information collected can be used to determine an estimated demographic for the visitors to certain websites. The panel-based approach might not provide useful information for infrequently visited websites. A survey-based approach has also been used. A survey can be placed on a given website soliciting visitors to provide their demographic information. However, it can be difficult to place surveys across a large number of websites, to ensure accurate visitor responses and to prevent spam attacks on surveys to bias answers. Further, response rates are generally low. Another approach can estimate demographics of website visitors using information known about persons living in a geographic location associated with an IP address of a visitor to the website.

SUMMARY

This invention relates to information management. In general, in one aspect, the invention features a computer implemented method, system, and computer readable medium having instructions encoded thereon, which, when executed by a processor, cause the processor to perform operations, for inferring destination scores for a set of web destinations. A set of traversals indicating visits to a set of web destinations are received. The set of traversals includes scored and unscored traversals, where a scored traversal is associated with a known score of at least one visitor property of a visitor associated with the traversal. Initial destination scores of the at least one visitor property for the web destinations visited by the scored traversals are inferred based on the known scores of the scored traversals. Initial scores for the at least one visitor property for the unscored traversals are estimated based on the initial destinations scores. Revised destination scores for the web destinations visited by the scored traversals and initial destination scores for the web destinations only visited by the unscored traversals are inferred based on the known scores of the scored traversals and the initial scores of the unscored traversals. Revised scores for the unscored traversals are estimated based on the revised destination scores for the web destinations visited by the scored traversals and the initial destination scores for the web destinations only visited by the unscored traversals. Revised destination scores for all of the web destinations are inferred based on the known scores of the scored traversals and the revised scores of the unscored traversals. Multiple iterations of the last two steps above are performed.

Implementations of the invention can include one or more of the following features. Iterations of the last two steps can be performed until the estimated revised scores of the unscored traversals stabilize. A revised score can stabilize if the root mean square difference between the score for two consecutive iterations is less than a predetermined threshold value. Inferring a destination score of the at least one visitor property for the web destinations based on the known scores of the scored traversals and the revised scores of the unscored traversals can include inferring a destination score based on the scores of the set of traversals using an expectation-maximization algorithm. In one example, the at least one visitor property is a visitor demographic property.

In general, in another aspect, the invention features a computer implemented method including the following steps: (a) receiving a set of traversals indicating visits to a set of web destinations, the set of traversals including scored and unscored traversals where a scored traversal is associated with a score of at least one visitor property of a visitor associated with the traversal; (b) determining initial scores for the unscored traversals; (c) determining destination scores for the web destinations based on the scores for the set of traversals; (d) rescaling the determined destination scores; (e) determining revised traversal scores for the unscored traversals based on the rescaled destination scores; and (f) rescaling the revised traversal scores.

Implementations of the invention can include one or more of the following features. The method can further include: (g) determining if the revised traversal scores have stabilized; and (h) if the revised traversal scores have not stabilized, then repeating steps (c) through (f) until the revised traversal scores have stabilized. In one example, the steps (c) and (e) above are performed by an algorithm that infers the destination and traversals scores by imputing values for a set of common latent variables.

In one implementation, rescaling the determined destination scores can include linearly rescaling the destination scores to adjust the mean and variance of the determined destination scores when computed from the unscored traversals to substantially equal the mean and variance of the destination score when computed from the scored traversals. In one implementation, rescaling the revised traversals scores can include linearly rescaling the traversals scores to adjust the mean of the revised traversals scores attributed to the unscored traversals to that of the traversal scores attributed to the scored traversals, while increasing the variance of the revised scores attributed to the unscored traversals.

Implementations of the invention can realize none, one or more of the following advantages. An estimate of a visitor property, e.g., a visitor demographic, can be estimated for a web destination regardless of the popularity of the web destination. As such, a broader range of web destinations can now determine demographics of their visitor base, which information can be helpful in shaping the content of their web destination, including advertisements displayed along with the content. Additionally, accurate demographics can be determined for web destinations while maintaining visitor privacy.

The details of one or more embodiments of the invention are set forth in the accompanying drawings and the descrip-

DESCRIPTION OF DRAWINGS

Like reference symbols in the various drawings indicate like elements.

DETAILED DESCRIPTION

Techniques, computer program products, methods and systems for inferring a visitor property, for example, a visitor demographic, for a visitor to a web destination are described. A web destination refers to a web experience, indexed and accessed by a distinct URL, which can be presented to a user through a web browser on a network connected computer. A web experience can refer to a web page, a set of associated web pages, a video presentation, or an interactive game or process. A web destination can also be accessed and/or interacted with through another software application or on another device. By way of illustrative example, a web site such as www.google.com can be a web destination. As another example, a piece of content such as an advertisement or a video accessible on the video website www.youtube.com, or embedded in a third party site or application, can be a web destination.

A "traversal", as the term is used herein, refers to a record of one or more web destinations visited during a particular web browsing session, presumably by one visitor. For example, if a particular person browsing the Internet visited five web destinations during a particular web browsing session, a record of the five web destinations visited associated with that visitor is referred to in the aggregate as a "traversal". If a particular visitor property is known about the visitor, for example, if the visitor property is "gender" and it is known the visitor is a male, then the traversal is referred to herein as a "scored" traversal with respect to that property. That is, a score of 1.0 male is accorded to the particular traversal. A scored traversal can be "unscored" for a second visitor property. For example, if a second visitor property is "age", and the age of the male visitor is not known, then with respect to the age property, the traversal is unscored.

A web destination owner may wish to determine an estimate of a score for a visitor property for the web destination. For example, if the visitor property is gender, the web destination owner or any other interested party, may wish to determine what percentage of visitors to the web destination are male. The percentage of visitors to the web destination that are male is the "destination score" for that particular web destination for the given visitor property. Techniques, methods, computer program products and systems are described herein for inferring (or estimating) a destination score for a web destination for a given visitor property based on a set of traversals including scored and unscored traversals.

For illustrative purposes, the techniques, computer program products, methods and systems described herein shall refer to one or more inferences of demographic information, however, the same techniques, computer program products, methods and systems can be used to infer other visitor properties. For example, visitor behavioral characteristics can be inferred.

Figure 1:
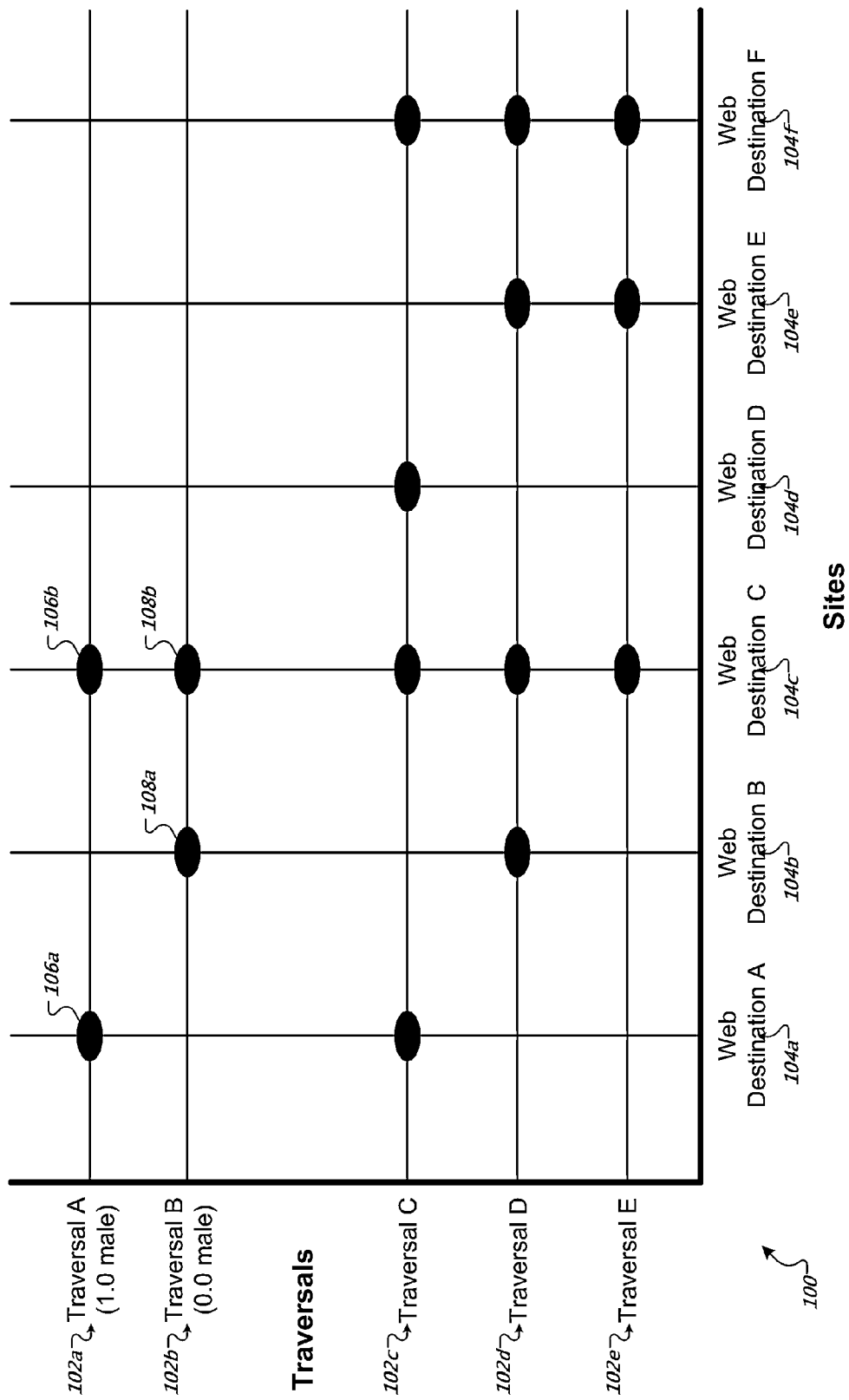
FIG. 1 is an example table showing relationships between visitor traversals and a set of web destinations.

Referring now to FIG. 1, a table 100 is shown illustrating relationships between traversals and web destinations. In some implementations, scored traversals may be determined from, for example, market research. A market research entity may determine properties of visitors, such as by collecting survey information for a set of visitors and recording the browsing activity of the visitors as traversals. The visitor properties determined from the survey information are associated with the corresponding recorded visitor traversals. Other techniques for obtaining scored traversals can be used, including, but not limited to, visitor-submitted data, visitor self identification, or known visitor associations with a property.

The table 100 includes multiple Traversals A-E 102a-e along the vertical axis and multiple Web destinations A-F 104a-f along the horizontal axis. For illustrative purposes, the visitor property to be determined with respect to the Web destinations A-F is gender. The Traversal A 102a has an associated scored property of "male" (or 1.0 male) and the Traversal B 102b has an associated scored property of "female" (or 0.0 male). The Traversals C-E 102c-e in this example are unscored with respect to the gender property.

The scored traversals, i.e., Traversals A 102a and B 102b can be used to determine an estimated destination score for at least those web destinations visited by Traversals A and B. That is, the Traversal A 102a includes visits 106a-b to the Web destinations A 104a and C 104c, respectively. The Traversal B 102b includes visits 108a-b to the Web destinations B 104b and C 104c, respectively. The estimated destination scores, in this example, for the Web destinations A-C 104a-c can be used to determine estimated scores for the Traversals C-E 102c-e. All of the traversal scores, i.e., the scores for Traversals A-E 102a-e can then be used to estimate destination scores for Web destinations A-F 104a-f. In this manner, estimated scores for all of the web destinations depicted in the table 100 can be estimated. Depending on the volume of data and the desired level of accuracy, different algorithms can be employed to determine the estimated destination scores. However, the principal remains the same; that is, a set of traversals including scored and unscored traversals can be used to determine estimated destination scores for a set of one or more web destinations associated with the set of traversals.

By way of illustration, a simple example is shown in FIG. 1. Based on the Traversals A-B 102a-b alone, which have a scored gender property, initial estimates of destination scores for the web destinations visited by the Traversals A 102a and B 102b, i.e., the Web destinations A-C 104a-c can be estimated as follows: Web destination A 100% male; Web destination B 0% male; and Web destination C 50% male. Now, based on the estimated destination scores for the Web destinations A-C 104a-c, scores can be estimated for the Traversals C-E 102c-e. For example, the Traversal C 102c visited the Web destination A 104a, which has an estimated score of 100% male, and not the Web destination B 104b, which has an estimated score of 0% male. Therefore, the Traversal C 102c can be estimated to have a gender property of "male." The Traversal D 102d visited the Web destination B 104b (0% male) and not the Web destination A 104a (100% male).

Therefore, the Traversal D 102d can be estimated to have a gender property of "not male", i.e., "female."

The Traversals C-E 102c-e all visited the Web destination C 104c (50% male). However, in this example, the Web destination C 104c can not be used to conclusively determine the estimated gender property of the Traversals C-E 102c-e. In one implementation, the estimated gender property of the Traversal E 102e is undecided and initially scored as 0.50.

The gender property of the Web destinations D-F 104d-f has not yet been estimated, based on the Traversals A 102a and B 102b, as neither traversal visited these web destinations. However, now that estimated scores are known for the Traversals C-E 102c-e, the Traversals C-E 102c-e can be used to estimate the gender property of the Web destinations D-F 104d-f. For example, the Traversal C 102c has an estimated property of "male" and the Traversal C 102c includes visits to the Web destinations D 104d and F 104f. The Traversal D 102d has an estimated property of "female" and includes visits to the Web destinations E 104e and F 104f. Therefore, based on the estimated gender properties of the Traversals C 102c and D 102d, the scores of the Web destinations D-F 104d-f can be estimated as 100% male, 0% male, and 50% male, respectively.

The Traversal E 102e includes visits to the Web destinations C 104c, E 104e, and F 104f. As previously described, the gender property of the Web destination C 104c (50% male) is inconclusive/insufficient in determining the estimated gender property of the Traversal E 102e as is the gender property of the Web destination F 104f (50% male). However, the visit to the Web destination E 104e (0% male) by the Traversal E 102e suggests that the Traversal E has an estimated gender property of "female."

The process described above is one iteration to determine a first estimate of destination scores for the Web destinations A-F 104a-f. However, additional iterations of the process can be performed to further refine the results and improve accuracy of the results. For example, the gender properties of the Web destinations D-F 104d-f can be recalculated based on the additional and/or recalculated properties of the Traversals A-E 102a-e.

Unlike some other techniques for determining or predicting values of visitor properties for unscored traversals, the methods and systems described herein use both the information implicit in the destination scores assigned to the web destinations and in the actual visitation patterns represented by both the scored and the unscored traversals. With real-world data, many web destinations are only visited by unscored traversals (e.g., Web Destinations D-F in FIG. 1), and typically the number of unscored traversals greatly outnumbers the number of scored traversals. Techniques that discard the information provided by the visits to such web destinations (e.g., Web Destinations D-F) are demonstrably less capable of inferring destination scores than the methods and systems described herein.

For example, referring again to FIG. 1, a technique that only used web destination data from the scored traversals set would be unable to determine anything about the behavior of Traversal E 102e, since the only overlapping web destination between Traversal E and the scored traversals, i.e., Traversals A and B, is Web Destination C. Web Destination C was visited by both the male visitor of Traversal A and the female visitor of Traversal B, and thus no inference as to the gender of the visitor of Traversal E is possible, based on this information alone. However, the methods and systems described herein take the behavior of Traversal E into consideration in the context of the behavior of other unscored traversals, i.e., Traversals C and D, in addition to the scored traversals, and it therefore becomes possible to determine a value of a visitor property, e.g., gender, for Traversal E.

The type of analysis provided by the methods and systems described herein processes unscored traversals together, rather than independently from one another. By contrast, techniques that predict values for unscored traversals in isolation are unable to use the information implicit in common visits to otherwise unscored web destinations. For example, Web Destinations D, E and F are all visited only by the unscored Traversals C-E (i.e., they are not visited by the scored Traversals A and B). The information about the visits to the Web Destinations D, E and F is unusable with a technique that predicts values for unscored traversals in isolation. For example, a technique based on assigning weights (sometimes referred to as biases) to web destinations visited by a set of scored traversals and inferring values of visitor properties for individual unscored traversals (independent of each other) on the basis of the assigned weights, does not make use of any of the available data concerning the web destinations not visited by the scored traversals, e.g., Web Destinations D-F. Similarly, techniques that attempt to determine the probability of a particular value of visitor property for a particular unscored traversal that is limited to using web destination data for only web destinations visited by scored traversals face the same limitations on their capabilities.

Referring again to FIG. 1, in the example described above, the scores of the Traversals A-E 102a-e are given a binary value (e.g., male or female) and the scores of the Web destinations A-F 104a-f are given a continuous value (e.g., the percentage of males visiting the web destination). Alternatively, traversals can be given continuous values for properties (e.g., a percentage or a fractional value) and/or web destinations may be given discrete values for properties (e.g., blue/brown/green/hazel eye color or male/female gender).

In one implementation, an expectation-maximization (EM) algorithm can be used to estimate destination scores based on a set of traversals. The EM algorithm finds maximum likelihood estimates of parameters, in this case, traversal and destination scores. The EM algorithm can be a more efficient technique when dealing with large volumes of data, than the rather simplistic algorithm described above.

Figure 2:
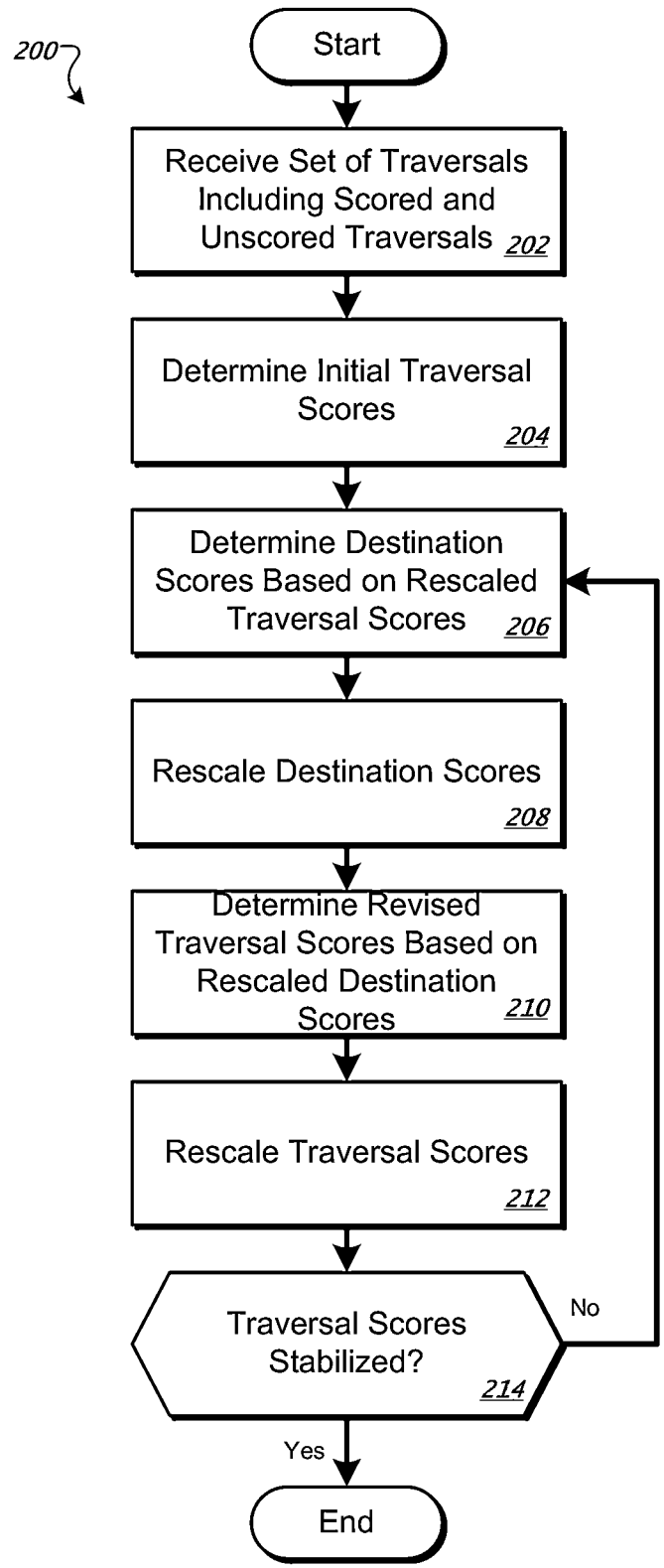
FIG. 2 is a flow chart showing an example process for inferring a visitor property.

Referring now to FIG. 2, a flowchart is shown including an example process 200 for determining estimated destination scores implementing an EM algorithm. The process 200 begins with receiving a set of traversals including one or more scored traversals and one or more unscored traversals (step 202). For example, the process 200 may receive the Traversals A-B 102a-b having scored properties from market research and the Traversals C-E 102c-e from other anonymous recorded browsing activity. In another example, the process 200 may determine the scored properties of the Traversals A-B 102a-b from an association of census data with geo-located Internet Protocol (IP) addresses in otherwise anonymous recorded browsing activity.

The process 200 determines an initial traversal score for each of the traversals for a given property (step 204). In one implementation, the process 200 determines an average of the particular visitor property and assigns the average as the initial traversal score to the unscored Traversals C-E 102c-e. By way of illustrative example, the process 200 may determine from survey information that 68% of visitors to the Internet are male, and therefore assign an initial traversal score of 0.68 to the unscored Traversals C-E 102c-e. In another example, the process 200 determines an average of the scored Traversals A-B 102a-b, i.e., an average of 1.0 and 0.0 is 0.50, and assigns the average to the unscored Traversals C-E 102c-e as an initial traversal score. In another example, the process 200 assigns a previously determined default score to the Traversals C-E 102c-e. The process 200 uses the known scores of the Traversals A-B 102a-b as the initial traversal scores of these traversals. The initial scores of the Traversals A-E 102a-e are shown in the following table. In this example, the initial scores of the Traversals C-E are based on known survey information. In this particular example, for illustrative purposes, the initial score of 0.68 is used, being the percentage of users of the Internet that are male.

TABLE 1

Initial Traversal Scores

| Traversal | Initial Traversal Score |
|---|---|
| Traversal A | 1.0 |
| Traversal B | 0.0 |
| Traversal C | 0.68 |
| Traversal D | 0.68 |
| Traversal E | 0.68 |

The process 200 next determines destination scores based on the current traversal scores, which in the first iteration are the initial traversal scores (step 206). One example process for determining destination scores (estimates) based on the traversal scores is described in further detail below in reference to FIGS. 4A-B, although a different algorithm to determine the estimated destination scores can be used.

Once the destination scores are determined, the process 200 rescales the destination scores (step 210). That is, some destination scores can be increased and others decreased. In one implementation, rescaling the determined destination scores includes linearly rescaling the values to adjust the mean and variance of the determined destination scores when computed from the unscored traversals to substantially equal the mean and variance of the destination scores when computed from the scored traversals. One example process for rescaling the destination scores is described in further detail below in reference to FIG. 5, although a different algorithm to rescale the destination scores can be used.

Revised traversal scores are now determined based on the rescaled destination scores (step 212). In one implementation, rescaling the revised traversal scores includes linearly rescaling the values to adjust the mean of the revised traversal scores attributed to the unscored traversals to that of the traversals scores attributed to the scored traversals, while increasing the variance of the revised scores attributed to the unscored traversals. One example process for determining revised traversal scores based on the rescaled destination scores is described in further detail below in reference to FIGS. 6A-B, although a different algorithm can be used.

In a next step the process 200 rescales the traversal scores (step 206). Some traversal scores can be increased and others decreased. One example process for rescaling the traversal scores is described in further detail below in reference to FIG. 3, although a different algorithm to rescale the traversal scores can be used.

A determination is then made as to whether the traversal scores have stabilized. That is, a rescaled traversal score can be compared to the initial traversal score (or the rescaled traversal score of a previous iteration) to determine whether the traversal score has stabilized. In one implementation, a traversal score is considered to have stabilized if the RMS (root mean square) difference between the traversal scores for two consecutive iterations of the process 200 is less than 0.001.

If the traversal scores are not stabilized ("no" branch of step 214), then the process 200 loops back to step 206 and repeats steps 206 to 212 until the traversal scores stabilize. When repeated, step 206 uses the rescaled traversal scores from the previous iteration. Once the traversal scores stabilize ("yes" branch of step 214), then the process 200 can end.

In one implementation, the estimated destination scores are the rescaled destination scores calculated in the last iteration of the process 200 at step 208. In another implementation, once the traversal scores are stabilized, the stabilized traversal scores are input back into the process at step 206 and the estimated destination scores are the rescaled destination scores determined at step 210.

Figure 3:
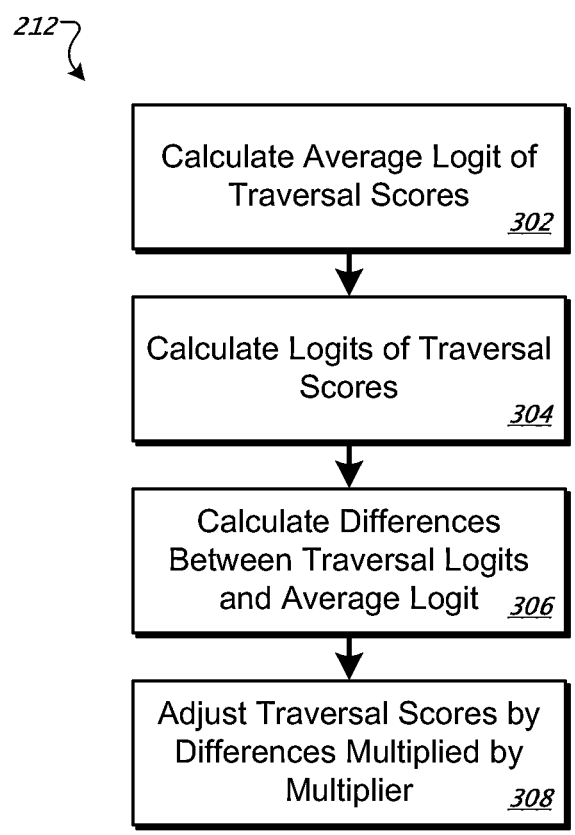
FIG. 3 is a flow chart showing an example process for calculating a rescaled traversal score.

Referring now to FIG. 3, a flowchart is shown including an example process 212 for rescaling traversal scores. The process 212 begins with calculating the average logit of the traversal scores (step 302). The process 212 calculates logits of the traversal scores (step 304). For example, the process 212 can calculate the logit of a score using the following equation:

$$logit(\text{score}) = \log\left(\frac{\text{score}}{1-\text{score}}\right)$$

The process 212 calculates differences between the calculated traversal score logits and the calculated average traversal score logit (step 306). The process 212 adjusts each of the traversal scores by the corresponding differences multiplied by a multiplier (step 308). For example, the process 206 can multiply the differences by a multiplier of 2.0 and adjust or add the multiplied differences to the corresponding traversals. In one implementation, the scored traversals do not change; that is, they are not rescaled nor otherwise revised throughout iterations of the algorithm.

Figure 4A:
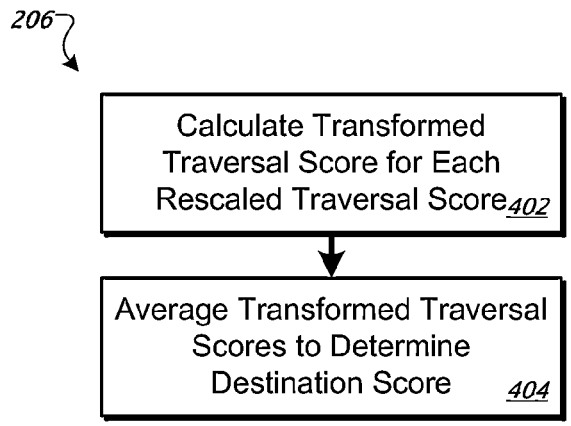
FIGS. 4A and 4B are flow charts showing an example process for calculating an estimated destination score.

Referring now to FIG. 4A, a flowchart is shown including an example process 206 for determining destination scores based on rescaled traversal scores. The process 206 begins with calculating a transformed traversal score for each of the rescaled traversal scores (step 402). Next, the process 206 averages the transformed traversal scores associated with a particular web destination to determine the destination score for that web destination (step 404).

Figure 4B:
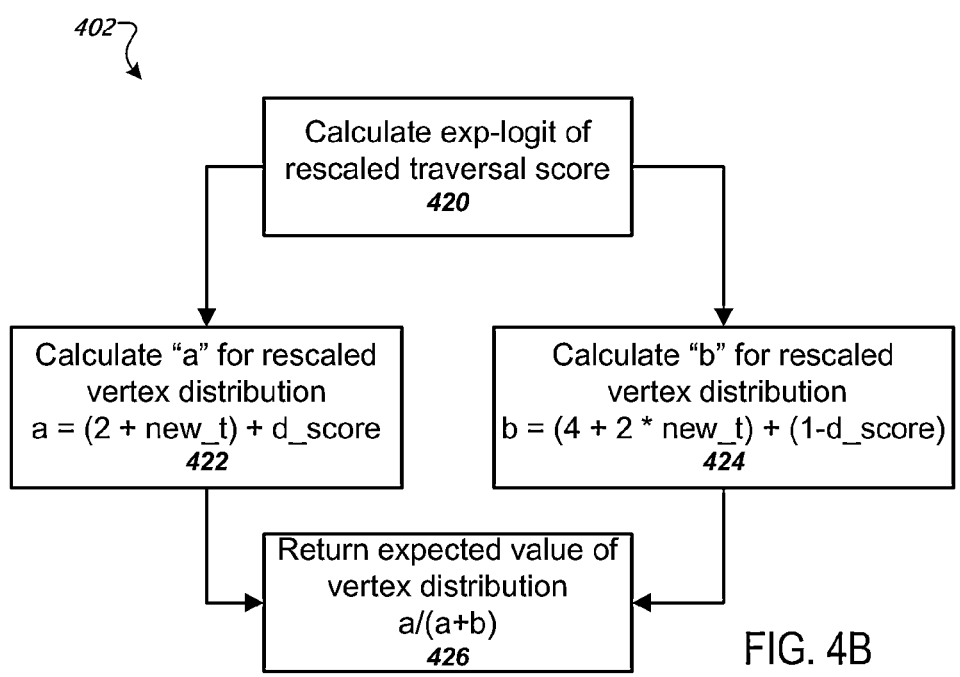

Referring now to FIG. 4B, a flowchart is shown including an example process 402 for calculating transformed transversal scores based on rescaled traversal scores i.e., one implementation for performing step 402 of FIG. 4A. An exp-logit is calculated for each rescaled traversal score (step 420). Exp-logit refers to the result of applying the exponential function to the logit, for example, exp-logit(x)=exp(logit(x))=exp (log (x/(1−x)))=x/(1−x).

An "a" parameter and a "b" parameter are calculated, where:

$a=(2+\text{new}\_t)+d\_\text{score}$ where, new_t=exp(logit (t_score), where t_score is the rescaled traversal score; and d_score=the last computed destination score corresponding to a vertex (t, d) [see FIG. 1].

$b=(4+2^* \text{new}\_t)+(1-d\_\text{score})$

The a and b parameters are then used to calculated the transformed traversal score for each rescaled traversal score, where the transformed traversal score=a/(a+b).

Figure 5:
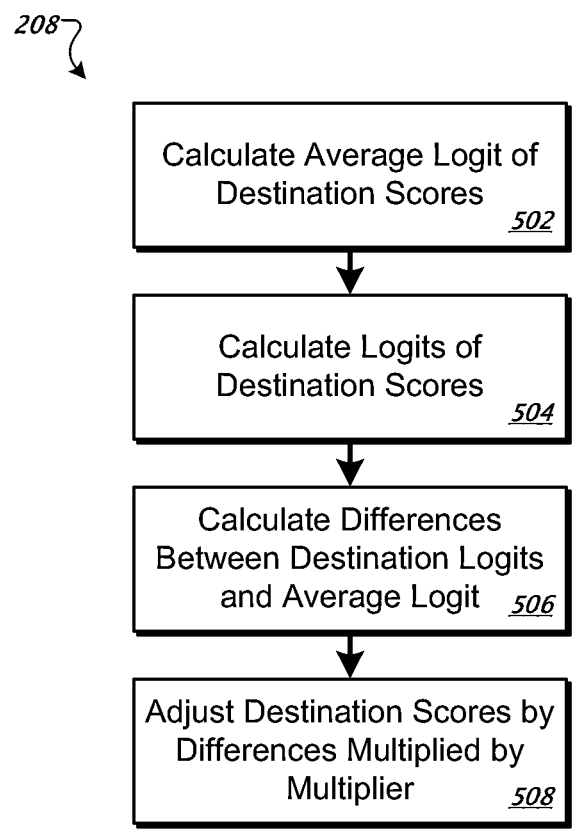
FIG. 5 is a flow chart showing an example process for calculating a rescaled destination score.

Referring now to FIG. 5, a flowchart is shown including an example process 208 for rescaling the destination scores. In one implementation, the process 208 can be used to implement step 208 shown in FIG. 2. The process 208 calculates an average logit of the destination scores (step 502). The logits of the destination scores are calculated (step 502). The process 208 calculates differences between the calculated destination score logits and the calculated average destination score logit (step 506).

The process 208 adjusts each of the destination scores by the corresponding differences multiplied by a multiplier (step 508). For example, the process 208 can multiply the differences by a multiplier that maintains the same logit standard deviation before and after adjusting the destination scores by the corresponding differences.

Figure 6A:
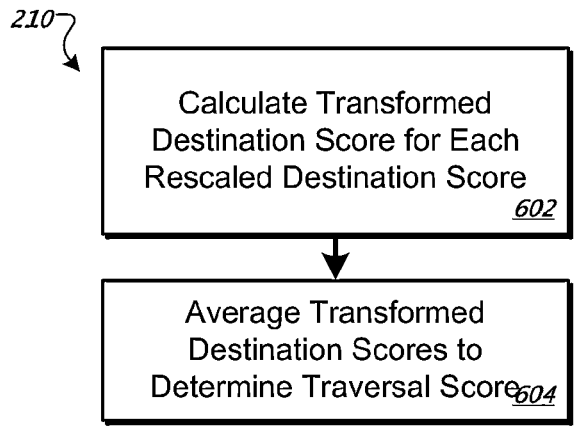
FIGS. 6A and 6B are flow charts showing an example process for calculating an estimated traversal score.

Referring now to FIG. 6A, a flowchart is shown including an example of a process 210 for determining revised traversal scores based on rescaled web destination scores. The process 210 begins with calculating a transformed destination score for each of the rescaled web destination scores (step 602). The calculation of the transformed destination scores is described with respect to FIG. 6B. Next the process 210 averages the transformed destination scores to determine the revised traversal score (step 604).

Figure 6B:
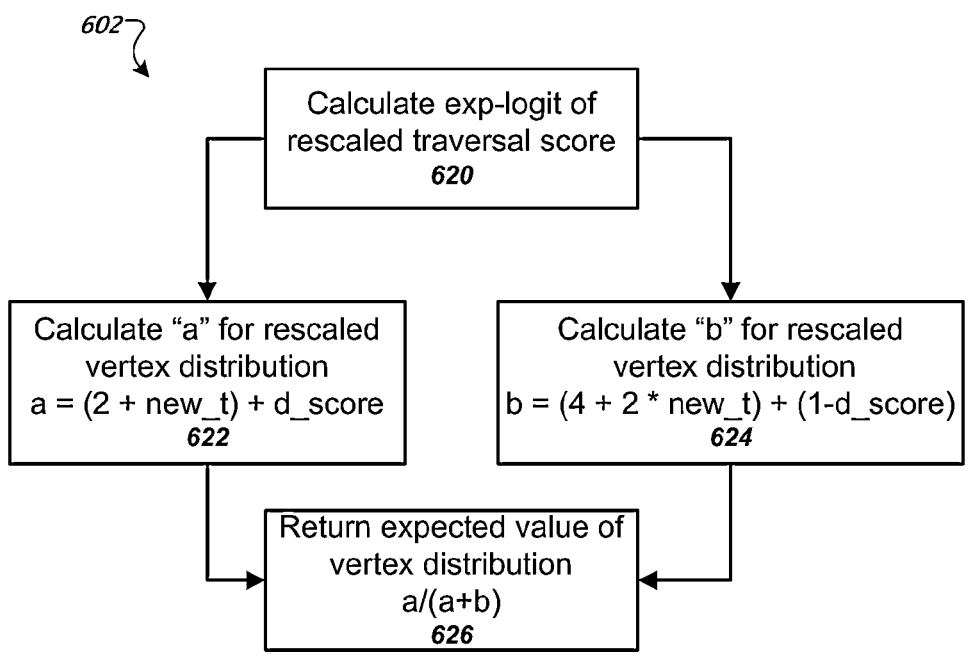

Referring now to FIG. 6B, a flowchart is shown including an example process 602 for calculating transformed destination scores based on rescaled destination scores i.e., one implementation for performing step 602 of FIG. 6A. An exp-logit is calculated for each rescaled traversal score (step 420). Exp-logit refers to the result of applying the exponential function to the logit, for example, exp-logit(x)= exp(logit(x))=exp (log(x/(1−x)))=x/(1−x).

An "a" parameter and a "b" parameter are calculated, where:

$a = (2 + \text{new\_}t) + d\_\text{score}$ where, new_t=exp(logit (t_score), where t_score is the rescaled traversal score; and
d_score=the last computed destination score corresponding to a vertex (t, d) [see FIG. 1].

$b = (4 + 2*\text{new\_}t) + (1 - d\_\text{score})$

The a and b parameters are then used to calculated the transformed destination score for each rescaled destination score, where the transformed destination score=a/(a+b).

As described above, an algorithm can be employed to fill in the missing values on the table 100 shown in FIG. 1. That is, scores for the unscored Traversals C-E 102c-e can be estimated and destination scores for the Web destinations A-F 104a-f can be estimated, starting with only the scored traversals, i.e., Traversals A and B 102a-b. With the missing values filled in, a visitor property for each of the Web destinations A-F can be inferred. In some examples the visitor property is demographic information. Such as in our illustrative example, the visitor property is the gender demographic. The end result of the process is to determine an estimated destination score for that visitor property. This information can be useful, for example, when determining content for the web destination, advertising to display on the web destination and where and how to advertise to attract visitors to the web destination, amongst other things.

To further illustrate how the above implementation for determining estimated destination scores can be performed, one example of pseudo-code that can be used is provided below. The pseudo-code is provided for illustrative purposes, and other code can be used to implement the algorithms described above.

In the example pseudo-code set forth below the term "bin" is used. A visitor property, e.g., a demographic feature, can be viewed as falling into "bins", where each individual visitor falls into exactly one bin for each visitor property. Gender, for example, is naturally two-binned, as all visitors are either male or female. Education can be multi-binned, for example, bin 1=no high school diploma; bin 2=high school diploma; bin 3=university degree, etc. For advertisement purposes, age, although measured in years, is typically broken into disjoint categories, for example, bin 1=less than 18 years; bin 2=18-24 years; bin 3=25-34 years, etc. The algorithm implemented using the pseudo-code below can be used for visitor properties that can be divided into bins, inferring a bin into which to assign each traversal.

The following pseudo-code shows example code for a main driver loop:

Main Driver Loop

```
Main loop:
Initialize unscored traversals to average values across
    population
repeat until convergence:
    Compute new destination scores
    Rescale new destination scores
    Normalize new destination scores across bins
    Compute new traversal scores
    Rescale new traversal scores
    Normalize new traversal scores across bins
    If RMS (root mean square) distance between new and
        old traversal scores is small enough,
        COMPLETE
    Else
        Goto loop start
```

The following pseudo-code provides example code for calculating the destination scores:

Destination Score Computation

```
Compute new destination scores:
For each destination, d:
    For each traversal, t, containing d:
        For each bin, b:
            new_vertex_score(t, d, b)=vertex_score(travers-
                al_score(t, b), destination_score(d, b))
            new_destination_score(d, b)+=new_vertex_score(t,
                d, b))
    new_destination_score(d, b)/=#(traversals containing
        d)
Rescale new destination scores:
For each bin, b:
    Compute mean and variance of the logits of the scores
        for all destinations for that single bin
    For each destination, d:
        -- average of the logit rescaled scores for bin b is
           average(b),
        -- variance of the rescaled scores is variance(b)
        logit_rescaled_destination_score(d,      b)=logit-
           _new_destination_score(d, b)−average(b)
        logit_rescaled_destination_score(d, b)/=variance(b)
        -- In one implementation, at this point, the average of
           the logit rescaled scores is zero, and the variance is
           one.
        logit_rescaled_destination_score(d,      b)*=desired
           variance(b)
        logit_rescaled_destination_score(d,      b)+=desired
           average(b)
        -- At this point, the average and variance have set to
           the desired target values.
        rescaled_destination_score(d, b)=inverse_logit(logi-
           t_rescaled_destination_score(d, b)))
```

Normalize destination bins:
For each destination, d:
   total_score=0
   For each bin, b:
      total_score+=rescaled_destination_score(d, b)
   -- Now the total score contains the sum of all scores. Since the scores across all bins together for each destination preferably add to 1, the algorithm makes that happen.
   For each bin b:
      rescaled_destination_score(d, b)/=total_score The following pseudo-code provides example code for calculating the traversal scores:

Traversal Score Computation

-- This routine computes the same vertex scores that are computed in the destination scoring routine. At convergence, the values are the same after update.
Compute new traversal scores:
For each traversal, t:
   For each destination, d, contained in t:
      For each bin, b:
         new_vertex_score(t, d, b)=vertex_score(traversal_score(t, b), destination_score(d, b))
         new_traversal_score(t, b)+=new_vertex_score(t, d, b)
         new_traversal_score(d, b)/=#(destinations containing t)
Rescale net traversal scores:
For each bin, b:
   Compute average, but not variance, of the logit scores for all traversals
   for that single bin b
   For each traversal, t:
      -- average of the logit rescaled scores for bin b is average(b),
      logit_rescaled_traversal_score(t, b)=logit_new_traversal_score(t, b)−average(b)
      -- At this point, the average of the logit rescaled scores is zero, and the variance is unknown.
      logit_rescaled_traversal_score(t, b)*=2.0;
      logit_rescaled_traversal_score(t, b)+=desired_average(b)
      -- At this point, the average logit traversal score has been set to the desired value, and the variance of the set of logit traversal scores has been increased. That is what is trying to be achieved in this implementation, and the traversal variance can become arbitrarily large as the process continues.
      rescaled_traversal_score(t, b)=inverse_logit(logit_rescaled_traversal_score(t, b)))
Normalize traversal bins:
For each traversal, t:
   total_score=0
   For each bin, b:
      total_score+=rescaled_traversal_score(t, b)
   -- The total score contains the sum of all scores. Now, since the scores across all bins together for each traversal preferably add to 1, the algorithm makes that happen.
   For each bin b:
      rescaled_traversal_score(t, b)/=total_score The following pseudo-code can be used to implement the process flows shown in FIGS. 4B and 6B herein.

Helper Function

-- The function provides a contrast enhancement transform that arises from a beta distribution defined by t_score and d_score simultaneously. This function can be used in computing both the new destination scores and the new traversal scores.
   vertex_score(t_score, d_score):
   new_t=exp(logit(t_score))
   a=(2+new_t)+d_score
   b=(4+2*new_t)+(1−d_score)
   return a/(a+b)

As mentioned above, the pseudo-code included herein is for illustrative purposes, and other pseudo-code and code can be used to implement the techniques, systems, processes and computer programs described herein.

In one embodiment, additional steps that preserve visitor privacy can advantageously be included. Visitor privacy can be preserved by use of anonymized data, noise introduction at the individual visitor level, or other techniques that protect the privacy of individual users that are part of a larger demographic group.

The invention and all of the functional operations described in this specification can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output.

The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; a magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

Figure 7:
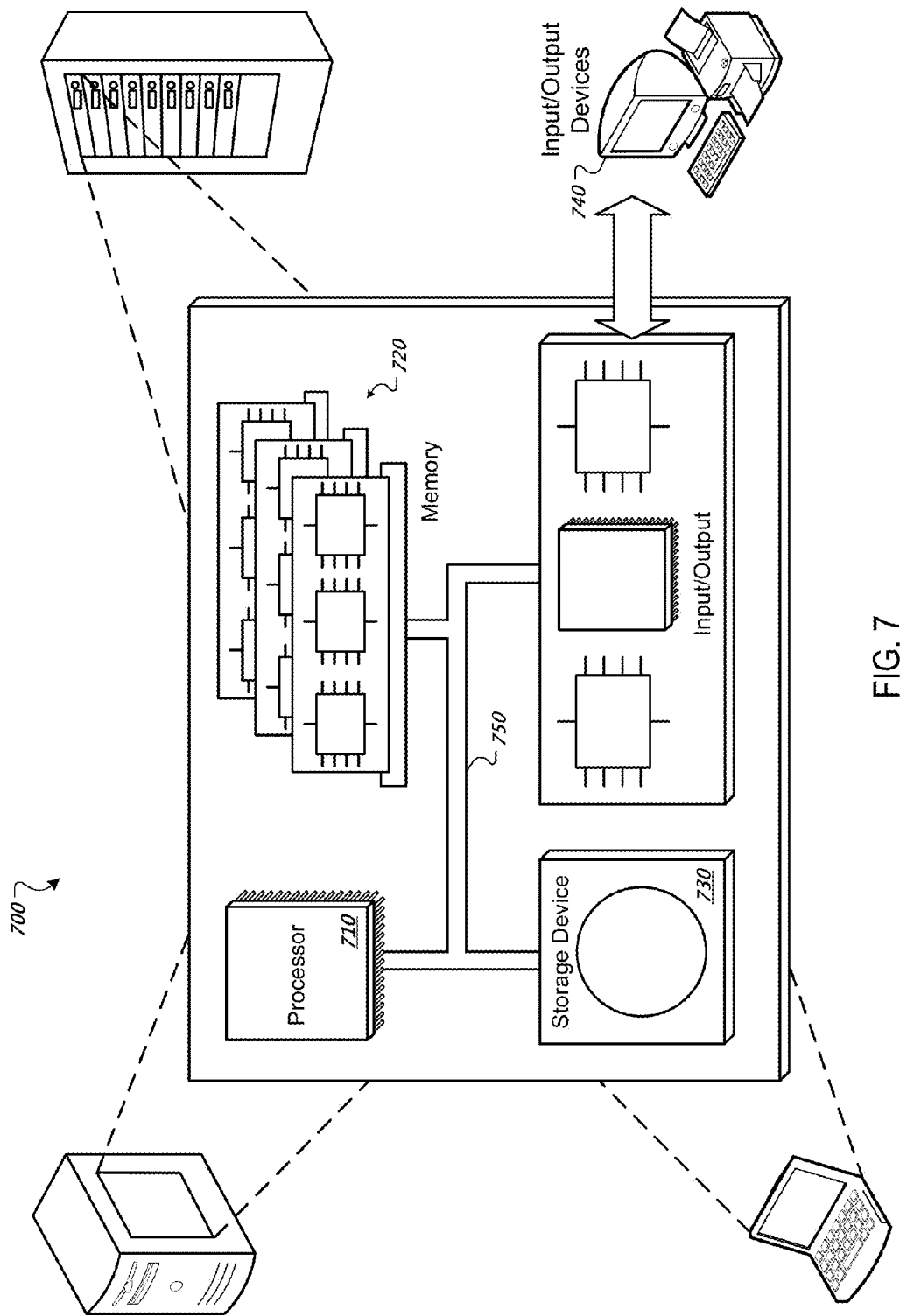
FIG. 7 is a schematic diagram of an example computer system.

Referring now to FIG. 7, a schematic diagram of an example computer system 700 is shown. The system 700 can be used for the operations described in association with the methods 200, 206, 208, 402, 210, 212, and 602 in FIGS. 2, 3, 4A, 4B, 5, 6A, and 6B, according to one implementation.

The system 700 includes a processor 710, a memory 720, a storage device 730, and an input/output device 740. Each of the components 710, 720, 730, and 740 can, for example, be interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740. In some embodiments, a parallel processing set of systems 700 connected over a network may be employed, clustered into one or more server centers.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 can, for example, include a hard disk device, an optical disk device, or some other large capacity storage device.

The input/output device 740 provides input/output operations for the system 700. In one implementation, the input/output device 740 includes a keyboard and/or pointing device. In another implementation, the input/output device 740 includes a display unit for displaying graphical user interfaces.

A number of embodiments of the invention have been described. Nevertheless, it will be understood that various modifications may be made without departing from the spirit and scope of the invention. Accordingly, other embodiments are within the scope of the following claims.

What is claimed is:

1. A computer implemented method comprising:
receiving a set of actions indicating interaction with web content, the set of actions including scored and unscored actions where a scored action is associated with a known score of at least one property of a user associated with the action;
inferring initial scores for the web content based on the known scores of the scored actions;
estimating initial scores for the unscored actions;
inferring revised scores for the web content and inferring initial scores for the web content only associated with the unscored actions based on the known scores of the scored actions and the initial scores of the unscored actions;
estimating, by one or more processors, revised scores for the unscored actions based on the revised scores for the web content associated with the scored actions and the initial scores for the web content only associated with the unscored actions;
inferring, by the one or more processors, revised scores for at least a portion of the web content based on the known scores of the scored actions and the revised scores of the unscored actions; and
performing a plurality of iterations of the estimating and inferring steps above.

2. The method of claim 1, wherein the plurality of iterations are performed until the estimated revised scores of the unscored actions stabilize.

3. The method of claim 2, wherein a revised score stabilizes if the root mean square difference between the score for two consecutive iterations is less than a predetermined threshold value.

4. The method of claim 1, wherein the at least one property comprises a demographic property.

5. The method of claim 1 wherein the actions are traversals.

6. The method of claim 5 wherein the web content is a web destination associated with a traversal.

7. A computer implemented method comprising:
receiving a set of actions indicating interactions with web content, the set of actions including scored and unscored actions where a scored action is associated with a score of at least one property of a user associated with the action;
determining scores for the web content based on the scores for the set of actions;
after determining the scores, determining initial scores for the unscored actions;
rescaling, by one or more processors, the determined scores based at least in part on the initial scores for the unscored actions;
determining, by the one or more processors, revised action scores for the unscored actions based on the rescaled scores; and
rescaling, by the one or more processors, the revised action scores based at least in part on the revised action scores for the unscored actions.

8. The method of claim 7, further comprising:
determining when the revised action scores have stabilized; and
when the revised traversal scores have not stabilized, then repeating the determining scores step through the rescaling the revised action scores step until the revised action scores have stabilized.

9. The method of claim 7, wherein rescaling the determined scores comprises: linearly rescaling the determined scores to adjust a mean and variance of the determined scores when computed from the unscored actions to equal a mean and variance of the scores when computed from the scored actions.

10. The method of claim 7, wherein rescaling the revised action scores comprises: linearly rescaling the revised action scores to adjust the mean of the revised action scores attributed to the unscored actions to that of the action scores attributed to the scored actions, while increasing the variance of the revised scores attributed to the unscored actions.

11. The method of claim 7, wherein the determining the score step through the determining revised action scores step are performed by an algorithm that infers the scores by imputing values for a set of common latent variables.

12. A system comprising:
a processor;
a storage device coupled to the processor and configurable for storing instructions, which, when executed by the processor, cause the processor to perform operations comprising:

receiving a set of actions indicating interaction with web content, the set of actions including scored and unscored actions where a scored action is associated with a known score of at least one property of a user associated with the action;

inferring initial scores for the web content based on the known scores of the scored actions;

estimating initial scores for the unscored actions;

inferring revised scores for the web content and inferring initial scores for the web content only associated with the unscored actions based on the known scores of the scored actions and the initial scores of the unscored actions;

estimating, by one or more processors, revised scores for the unscored actions based on the revised scores for the web content associated with the scored actions and the initial scores for the web content only associated with the unscored actions;

inferring, by the one or more processors, revised scores for at least a portion of the web content based on the known scores of the scored actions and the revised scores of the unscored actions; and performing a plurality of iterations of the estimating and inferring steps above.

13. The system of claim 12, wherein the plurality of iterations are performed until the estimated revised scores of the unscored actions stabilize.

14. The system of claim 12, wherein a revised score stabilizes if the root mean square difference between the score for two consecutive iterations is less than a predetermined threshold value.

15. The system of claim 12, wherein the at least one property comprises a demographic property.

16. The system of claim 12 wherein the actions are traversals.

17. The system of claim 16 wherein the web content is a web destination associated with a traversal.

18. A computer readable medium having instructions encoded thereon, which, when executed by a processor, cause the processor to perform operations comprising:

receiving a set of actions indicating interaction with web content, the set of actions including scored and unscored actions where a scored action is associated with a known score of at least one property of a user associated with the action;

inferring initial scores for the web content based on the known scores of the scored actions;

estimating initial scores for the unscored actions;

inferring revised scores for the web content and inferring initial scores for the web content only associated with the unscored actions based on the known scores of the scored actions and the initial scores of the unscored actions;

estimating, by one or more processors, revised scores for the unscored actions based on the revised scores for the web content associated with the scored actions and the initial scores for the web content only associated with the unscored actions;

inferring, by the one or more processors, revised scores for at least a portion of the web content based on the known scores of the scored actions and the revised scores of the unscored actions; and performing a plurality of iterations of the estimating and inferring steps above.

19. The product of claim 18 wherein the actions are traversals.

20. The product of claim 19 wherein the web content is a web destination associated with a traversal.

\* \* \* \* \*